J. A. WRIGHT.
VEHICLE TIRE.
APPLICATION FILED DEC. 10, 1908.
960,135.
Patented May 31, 1910.
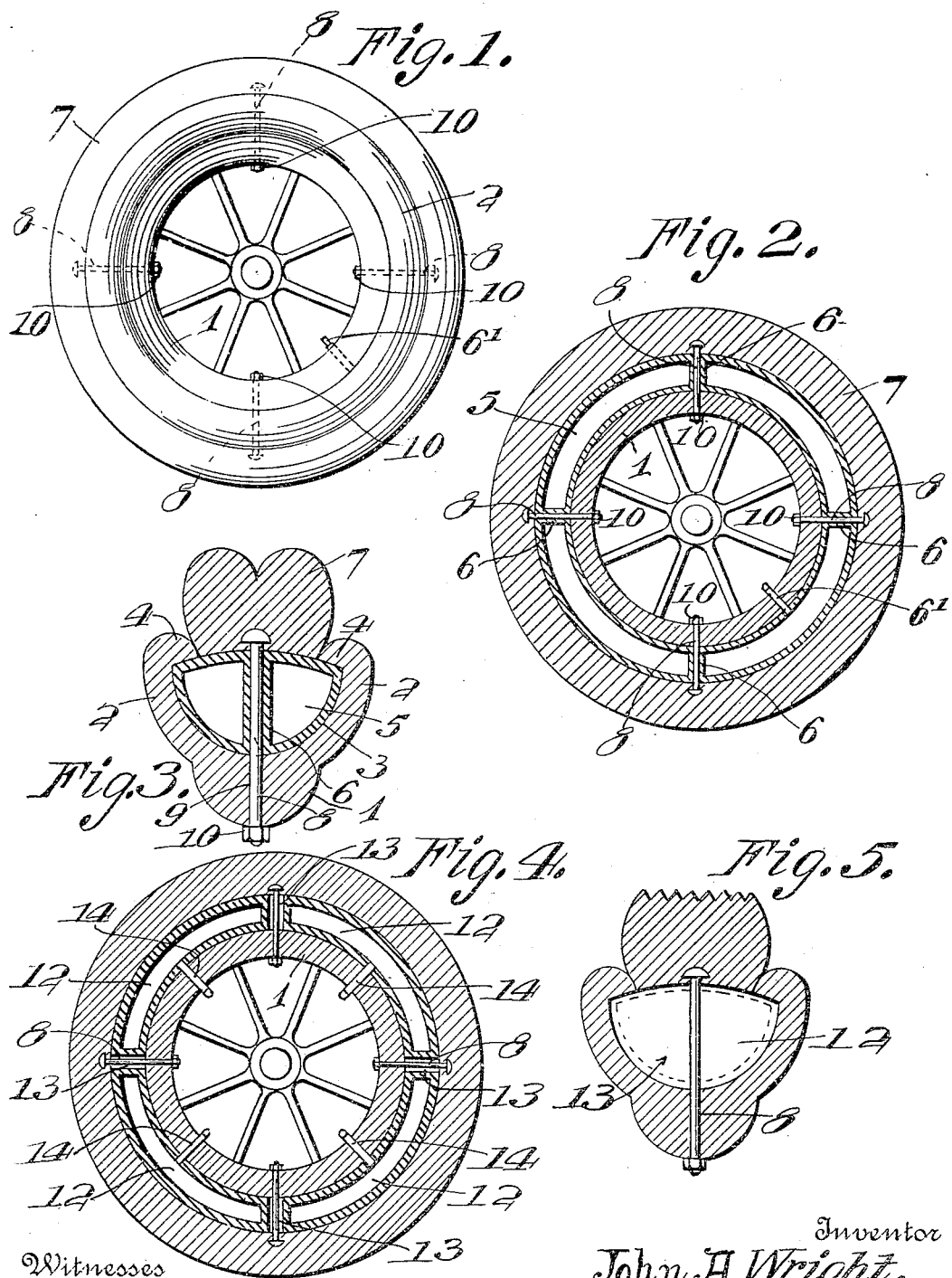
Witnesses
E. D. B. Brown
C. H. Griesbauer
Inventor
John A. Wright,
By H. B. Willson & Co.
Attorneys

UNITED STATES PATENT OFFICE.

JOHN A. WRIGHT, OF BROWNSVILLE, PENNSYLVANIA.

VEHICLE-TIRE.

960,135.         Specification of Letters Patent.     Patented May 31, 1910.

Application filed December 10, 1908. Serial No. 466,854.

*To all whom it may concern:*

Be it known that I, JOHN A. WRIGHT, a citizen of the United States residing at Brownsville, in the county of Fayette and State of Pennsylvania, have invented certain new and useful Improvements in Vehicle-Tires; and I do declare the following to be a full, clear, and exact description of the invention, such as will enable others skilled in the art to which it appertains, to make and use the same.

This invention relates to improvements in vehicle tires.

The object of the invention is to provide a combined cushion and pneumatic tire which will possess all the advantages of an ordinary pneumatic tire but which will be absolutely punctureless.

With this and other objects in view, the invention consists of certain novel features of construction, combination and arrangement of parts, as will be more fully described and particularly pointed out in the appended claim.

In the accompanying drawings, Figure 1 is a side view of the wheel showing the invention applied thereto. Fig. 2 is a longitudinal sectional view of the same. Fig. 3 is a cross sectional view through the rim and tire. Fig. 4 is a view similar to Fig. 2, showing a modified construction of the tire. Fig. 5 is a cross sectional view through the tire shown in Fig. 4 taken between two sections of the same.

Referring more particularly to Figs. 1, 2 and 3 of the drawings, 1 denotes the rim of the wheel said rim being provided on each side with upwardly projecting outwardly curved flanges 2 said flanges forming between themselves a continuous groove or channel 3. On the upper ends of the flanges 2 are formed inwardly projecting annular lips 4.

In the channel 3 formed by the flanges 2 is arranged a continuous pneumatic tire 5, said tire being substantially semi-circular in cross section as shown. In the tire 5 at suitable intervals are formed radial elastic tubes 6, the purpose of which will be hereinafter described. The tire 5 is provided with the usual inflating valve 6' which is arranged in an inflating tube passing through a suitable aperture in the rim as shown.

Arranged around the pneumatic tire 5 is a solid or cushion tire 7. Said tire has its inner surface in engagement with the pneumatic tire and is adapted to work between the inwardly projecting lips 4 of the flanges 2. The outer tire 7 is secured to the rim by means of a series of fastening bolts 8 the heads of which are embedded in the material forming the tire 7. The bolts 8 are inserted through the tubes 6 of the pneumatic tire and through suitable passages 9 formed in the rim and on the inner ends of the bolts are fastening nuts 10 whereby the outer cushion tire 7 is detachably secured in operative position around the pneumatic tire. By this arrangement the yielding effect of the pneumatic tire is preserved the pressure of the load serving to compress the pneumatic tube and the bolts 8 being forced by said pressure out through the rim sliding in the apertures, 9, while all danger of the pneumatic tire being punctured is eliminated by the outer cushion tire 7. The outer or tread surface of the cushion tire 7 may be of any desired shape, the same being shown in Fig. 3 as provided with a central groove thus providing parallel lobes which serve to prevent skidding of the tire. The tire may also be formed with a ribbed or serrated bearing surface, as shown in Fig. 5 of the drawing.

It will be obvious that in the mounting of the tire the pneumatic tire 5 is first slipped over the rim 1 into the channel 3 with the tubes 6 therein registering with the apertures in said rim and the outer tire 7 with the bolts 8 secured thereto is then slipped side wise over the rim the free ends of the bolts being inserted through the tube 6 in the collapsible tire 5 after which the nuts 10 are secured on said bolt and the tire 5 inflated.

In Figs. 4 and 5 of the drawings is shown a modified construction and arrangement of the pneumatic tire, said tire being shown in this figure as formed of a series of independent segmental sections 12 which are arranged in the groove or channel of the rim and are of such length as to provide a series of spaces 13 between the ends of the sections to provide for the passage of the bolts 8 employed to secure the outer cushion tire in place. In the latter form of the tire each of the sections 12 is provided with an inflating valve 14 whereby said sections are independently inflated.

The invention may be applied to wheels of any desired character and having either steel or wooden spokes.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim as new and desire to secure by Letters-Patent, is—

In a vehicle wheel, a rim having an annular groove or channel in its outer face, the side walls of which are flared upwardly and outwardly with the free edges thereof provided with inturned laterally extending lips or flanges to form a channel substantially semi-circular in cross section, the outer faces of said lips being rounded and curved downwardly toward their free edges, a pneumatic tire conforming to the shape of and housed within said channel with the opposite sides of its flat upper face arranged under and engaging the inner faces of said lips or flanges, a solid tire of substantially the same width as the space between the edges of said inturned flanges, said solid tire being arranged over and around the exposed upper face of said pneumatic tire between said flanges, with the opposite sides thereof contacting with the rounded edges of said rim flanges, said rim and solid tire forming a complete protective covering for said pneumatic tire, and means for connecting said solid tire with said rim to hold said tire against displacement.

In testimony whereof I have hereunto set my hand in presence of two subscribing witnesses.

JOHN A. WRIGHT.

Witnesses:
H. A. COTTOM,
ROSE MOOREHOUSE.